(12) United States Patent
Nelson et al.

(10) Patent No.: US 11,588,977 B2
(45) Date of Patent: Feb. 21, 2023

(54) SPECTRAL DECOMPOSITION OF AMBIENT LIGHT MEASUREMENTS

(71) Applicant: ams International AG, Jona (CH)

(72) Inventors: Doug Nelson, Eindhoven (NL); George Richard Kelly, Eindhoven (NL); James Archibald, Eindhoven (NL); Pradeep Hegde, Eindhoven (NL); Timothy Cogan, Eindhoven (NL)

(73) Assignee: AMS INTERNATIONAL AG, Rapperswil (CH)

( * ) Notice: Subject to any disclaimer, the term of this patent is extended or adjusted under 35 U.S.C. 154(b) by 0 days.

(21) Appl. No.: 17/437,258

(22) PCT Filed: Mar. 9, 2020

(86) PCT No.: PCT/EP2020/056172
§ 371 (c)(1),
(2) Date: Sep. 8, 2021

(87) PCT Pub. No.: WO2020/182708
PCT Pub. Date: Sep. 17, 2020

(65) Prior Publication Data
US 2022/0172676 A1    Jun. 2, 2022

Related U.S. Application Data

(60) Provisional application No. 62/825,380, filed on Mar. 28, 2019, provisional application No. 62/815,419, filed on Mar. 8, 2019.

(51) Int. Cl.
*G09G 3/3225* (2016.01)
*H04N 5/235* (2006.01)

(52) U.S. Cl.
CPC ......... *H04N 5/2351* (2013.01); *G09G 3/3225* (2013.01); *G09G 2360/141* (2013.01); *G09G 2360/144* (2013.01); *G09G 2360/16* (2013.01)

(58) Field of Classification Search
CPC ........... G09G 3/3225; G09G 2360/141; G09G 2360/144; G09G 2360/16; H04N 5/2351
See application file for complete search history.

(56) References Cited

U.S. PATENT DOCUMENTS

2013/0063471 A1    3/2013   Sugiyama
2015/0092186 A1    4/2015   Wieser
(Continued)

OTHER PUBLICATIONS

International Search Report dated Jun. 15, 2020 for corresponding International Application No. PCT/EP2020/056172.

*Primary Examiner* — David Tung
(74) *Attorney, Agent, or Firm* — Tarolli, Sundheim, Covell & Tummino LLP

(57) ABSTRACT

The present disclosure describes a method and apparatus that can be used to adjust for distorted ambient light readings caused by the ambient light sensor being located behind the display screen. The strategy of the disclosure relies, at least in part, on spectral decomposition of ambient light measurements into independent sources (e.g., red, green, and blue display components of an Organic Light Emitting Diode ("OLED") display screen and ambient light). Following the spectral decomposition technique, a more accurate ambient light measurement can be obtained in some instances. This technique enables determinations such as ambient lux and correlated color temperature independent of the content displayed on the screen.

20 Claims, 9 Drawing Sheets

(56) References Cited

U.S. PATENT DOCUMENTS

| | | | |
|---|---|---|---|
| 2015/0332655 A1* | 11/2015 | Krus | G06F 1/3206 345/207 |
| 2016/0232828 A1 | 8/2016 | Jia | |
| 2017/0084250 A1 | 3/2017 | Jia | |
| 2018/0274974 A1* | 9/2018 | Wang | H01L 27/3269 |
| 2019/0318696 A1* | 10/2019 | Imai | G09G 3/3607 |

* cited by examiner

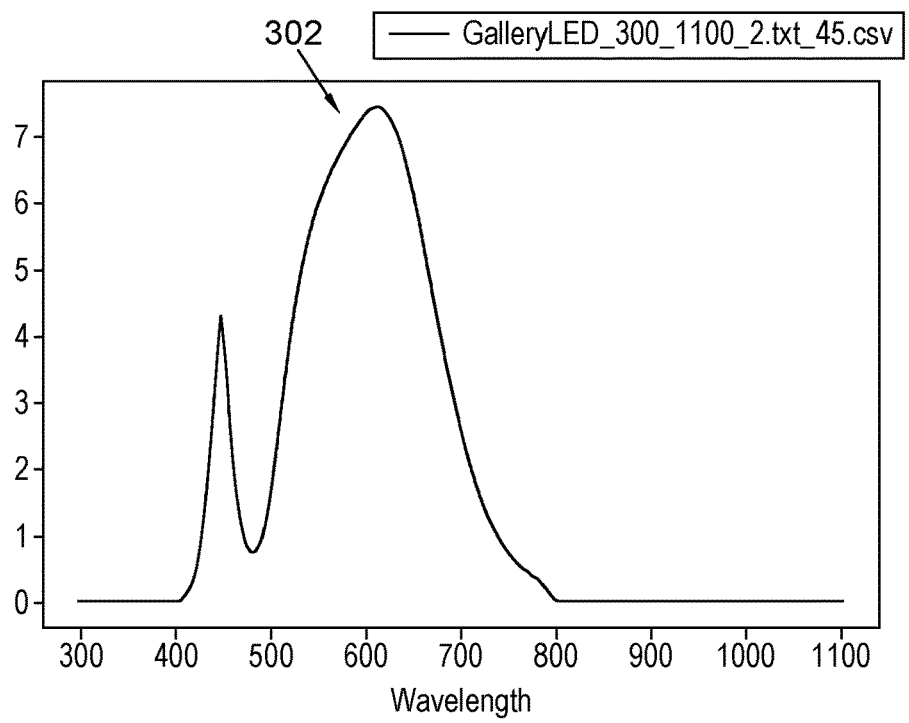
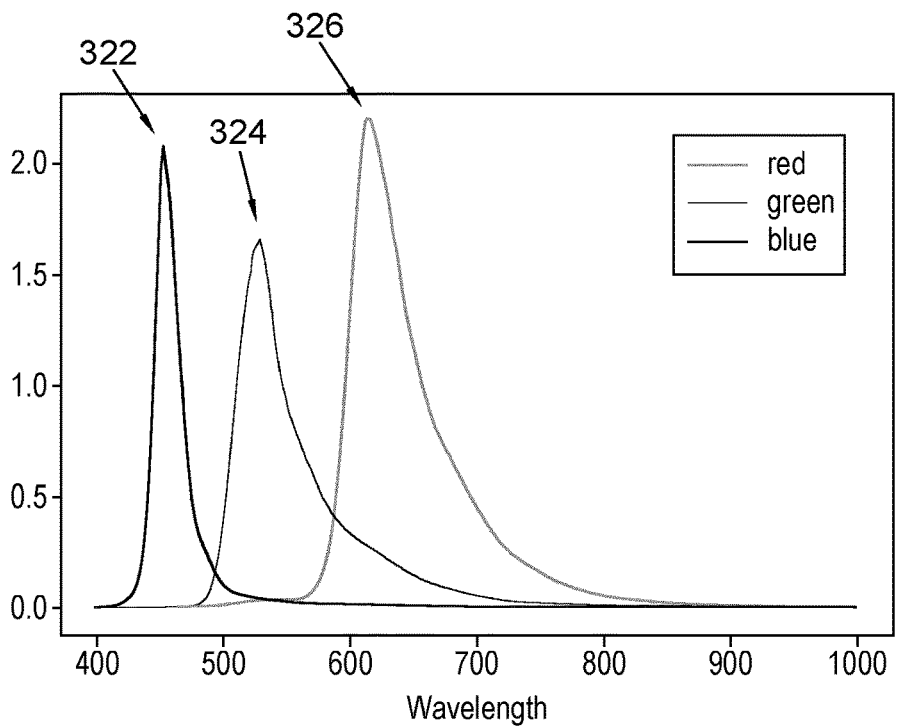
Fig. 3

$$\begin{bmatrix} r_0 \\ r_1 \\ \vdots \\ r_n \end{bmatrix} r_s + \begin{bmatrix} g_0 \\ g_1 \\ \vdots \\ g_n \end{bmatrix} g_s + \begin{bmatrix} b_0 \\ b_1 \\ \vdots \\ b_n \end{bmatrix} b_s + \begin{bmatrix} l_0 \\ l_1 \\ \vdots \\ l_n \end{bmatrix} l_s = \begin{bmatrix} m_0 \\ m_1 \\ \vdots \\ m_n \end{bmatrix}$$

$$\begin{bmatrix} r_0 \\ r_1 \\ \vdots \\ r_n \end{bmatrix} r_s + \begin{bmatrix} g_0 \\ g_1 \\ \vdots \\ g_n \end{bmatrix} g_s + \begin{bmatrix} b_0 \\ b_1 \\ \vdots \\ b_n \end{bmatrix} b_s + \begin{bmatrix} l_{00} \\ l_{01} \\ \vdots \\ l_{0n} \end{bmatrix} l_{s0} + \begin{bmatrix} l_{10} \\ l_{11} \\ \vdots \\ l_{1n} \end{bmatrix} l_{s1} = \begin{bmatrix} m_0 \\ m_1 \\ \vdots \\ m_n \end{bmatrix}$$

$$\begin{bmatrix} r_0 & g_0 & b_0 & l_0 \\ r_1 & g_1 & b_1 & l_1 \\ \vdots & \vdots & \vdots & \vdots \\ r_n & g_n & b_n & l_n \end{bmatrix} \begin{bmatrix} r_s \\ g_s \\ b_s \\ l_s \end{bmatrix} = \begin{bmatrix} m_0 \\ m_1 \\ \vdots \\ m_n \end{bmatrix}$$

Fig. 9

SPECTRAL DECOMPOSITION OF AMBIENT LIGHT MEASUREMENTS

RELATED APPLICATIONS

The present invention is a U.S. National Stage under 35 USC 371 patent application, claiming priority to Serial No. PCT/EP2020/056172, filed on 9 Mar. 2020; which claims priority from U.S. Provisional Application No. 62/815,419 filed 8 Mar. 2019 and from U.S. Provisional Application No. 62/825,380 filed 28 Mar. 2019, the entirety of each of which are incorporated herein by reference.

FIELD OF THE DISCLOSURE

This disclosure relates to ambient light sensors.

BACKGROUND

A recent trend in smartphone industrial design, fueled by consumer demand for higher screen to body ratios, has been to maximize the screen area by reducing the bezel width and decluttering the remaining bezel area by removing apertures for optical sensors and other holes for microphones, speakers and/or fingerprint reading devices. This trend has led to many optical sensors, including ambient light sensors, being placed behind the screen. Although, ambient light sensors are able to perform light measurements while behind the screen, on screen content, in many instances, can greatly distort those measurements. For example, a white display will increase the amount of light hitting the ambient light sensor, causing the sensor to overestimate the ambient lux level.

SUMMARY

The present disclosure describes a method and apparatus that can be used to adjust for the distorted readings caused by the ambient light sensor being located behind the display screen. The strategy of the disclosure relies, at least in part, on spectral decomposition of raw light measurements into independent sources (e.g., red, green, and blue display components of an Organic Light Emitting Diode ("OLED") display screen and ambient light). Following the spectral decomposition technique, a more accurate ambient light measurement can be obtained in some instances. This technique enables determinations such as ambient lux and correlated color temperature independent of the content displayed on the screen.

The described techniques may be executed, for example, by an electronic control unit or another hardware device. In some embodiments, the hardware device or the electronic control unit may be used in combination with software to execute the actions described herein. In particular, the electronic control unit receives, from an ambient light sensor disposed behind a display screen, a first data set comprising measurements from each of multiple optical channels. For example, in some implementations, the ambient light sensor includes eleven optical channels that can be used to measure light. Each of the eleven optical channels may be configured to filter light for a specific portion of the visible light spectrum. The electronic control unit may receive spectral data from each optical channel. In some embodiments, the electronic control unit may receive infrared data from optical channels configured for infrared detection.

Additionally, the electronic control unit is operable to retrieve, from the memory, a second data set including reference data based on prior measurements for the optical channels, where the prior measurements are for the display screen. For example, the control unit may be part of a smartphone device that also includes an ambient light sensor and an Organic Light Emitting Diode ("OLED") display screen. The OLED display screen may have a specific spectral power distribution (e.g., reference data). This reference data may have been measured at a prior point in time (e.g., at the factory, in a store, when first setting up the phone, or other suitable time). Specifically, each of the red, green, and blue colors of the RGB spectrum may have specific values (or unit values) associated with the OLED display. The electronic control unit may retrieve those values from memory. Those values may be in the same format as the spectral response data. For example, if the spectral response data received from the ambient light sensor is formatted by using eleven optical channels, spectral response data for the OLED display screen (e.g., the reference data) can also be formatted to be used with eleven optical channels. Reference data for specific optical channels may be insignificant in view of the type of display screen being measured. Therefore, reference data may include zero values for one or more optical channels.

The electronic control unit is operable to generate an ambient light measurement by using the reference data for the optical channels to modify the measurement data from the optical channels in the first data set. For example, the electronic control unit may take the spectral response data collected from each of the optical channels and subtract, from the collected spectral response data, the spectral power distribution data for the OLED display screen (e.g., the reference data). In some embodiments, the spectral response data may be stored as unit data (i.e., without a magnitude). In these and other embodiments, the magnitude may be calculated, for example, based on the spectral response data (i.e., the data collected from the ambient light sensor). In some embodiments, the magnitude may be calculated based on the output of the display screen.

In some embodiments the first data (e.g., spectral response data) can be stored as a vector with a number of dimensions equal to the number of optical channels. Specifically, in such cases, the electronic control unit generates a first vector from the first data set, where the first vector has a number of dimensions equal to a number of optical channels, and where each value within the first vector corresponds to a measurement from an optical channel of the optical channels used in the measurement. For example, for a device with eleven optical channels the first data will include a vector with eleven dimensions with each dimension corresponding to a specific optical channel. Furthermore, in some embodiments, the electronic control unit retrieves a second vector with each value within the second vector corresponding to a stored reference light unit measurement for a corresponding optical channel. For example, each OLED may have a specific associated light unit measurement. The light unit measurement may be spectral data for a specific light source (e.g., OLED) without a magnitude. Thus, in some embodiments, the electronic control unit generates the ambient light measurement by subtracting, from the first vector (e.g., the collected spectral data), the second vector (e.g., the reference data) that is modified by a magnitude value of light produced by the display screen.

When the reference data is removed from the spectral response data, an ambient light estimate is generated. Based on this estimate, the electronic control unit is able to determine what kind of light source(s) are acting upon the ambient light sensor. In some embodiments, the electronic control unit retrieves, from the memory, multiple unit vectors for known ambient light sources, where the unit vectors include one or more of a unit vector for a single light source and a unit vector for multiple light sources of one type. Using the unit vectors and the light measurement, the electronic control unit identifies one or more ambient light sources present.

For example, in some implementations, the electronic control unit is able to access a database that stores reference data for different light sources and retrieve the reference data. In some embodiments, the database may store reference data for a combination of light sources of one type. The reference data may be stored as vector data for a specific number of dimensions (e.g., one dimension per optical channel) so that the reference data may be compared with an ambient light measurement to determine which light source(s) have been detected by the ambient light sensor. In some embodiments, the reference data may be stored in a different format and then formatted for a specific number of dimensions as needed. For example, the electronic control unit may retrieve reference data for an incandescent light or multiple incandescent lights (e.g., an eleven dimension unit vector) and compare the retrieved reference data with the ambient light measurement. If the values match, the electronic control unit determines that there is an incandescent light that is hitting the ambient light sensor In some embodiments, the electronic control unit identifies the one or more ambient light sources by generating linear equations corresponding to the optical channels, where a number of unknowns within the linear equations corresponds to the number of the one or more ambient light sources. The same process can be used to identify a combination of light sources of the same type.

In some embodiments, different functions may be performed based on the type of ambient light(s) detected. Specifically, the electronic control unit may modify an output of the display screen based on one or more of a type and a magnitude of the one or more ambient light sources. For example, if there is only a small amount of ambient light being detected, the electronic control unit may instruct the host device (e.g., a smartphone) to adjust the screen. In some embodiments, the electronic control unit modifies a setting of a camera based on one or more of a type and a magnitude of the one or more ambient light sources. For example, the electronic control unit may modify a setting of a flash of a camera based on the type of light to get to a proper light temperature in a picture.

It is also possible to make these modification based on the ambient light measurement itself, instead of the types of light sources. Specifically, in such cases, the electronic control unit modifies an output of the display screen based on the ambient light measurement. In some embodiments, the electronic control unit modifies a setting of the camera based on the ambient light measurement. For example, the host device (e.g., a smartphone) may include a database of different ambient light measurements and corresponding screen modifications. The electronic control unit, may compare the ambient light measurement detected with different ambient light measurements in the database to determine which function to execute. Those functions may be camera modification options, screen modification options, and other suitable options.

The details of one or more implementations are set forth in the accompanying drawings and the description below.

Other features and advantages will be apparent from the description and drawings, and from the claims.

BRIEF DESCRIPTION OF DRAWINGS

FIG. 3 illustrates a spectral power distribution graph for an LED light source and spectral power distribution graph for an OLED display.

FIG. 6 illustrates possible vectors to be used in generating an ambient light measurement.

FIG. 8 illustrates a number of vectors that include both the vectors for a display and vectors for two light sources affecting the ambient light sensor.

FIG. 9 illustrates a vector equation.

DETAILED DESCRIPTION

Figure 1:
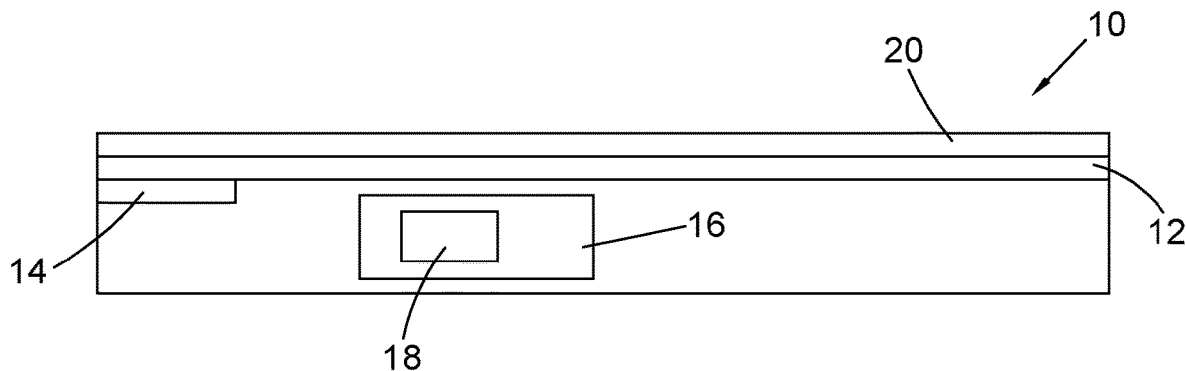
FIG. 1 illustrates an example of a host device (e.g., a smartphone).

As shown in FIG. 1, a host device 10 such as a portable computing device (e.g., a smartphone, personal digital assistant (PDA), laptop or wearable) includes an OLED-type or other display screen 12, which can be disposed directly under a front glass 20. An ambient light sensor (ALS) 14 is disposed directly under a portion of the display screen 12 and is operable to sense ambient light (e.g., sunlight or other background light). The ALS 14 also may sense light generated by the display screen 12 itself. The ALS 14 can comprise one or more photodiodes or other light sensing elements, each of which is sensitive to a respective wavelength, or range of wavelengths, that may differ from one another. An electronic control unit (ECU) 16 is configured to receive, process and analyze signals from the ALS 14 and may control certain functions (e.g., brightness and color) of display screen 12. The ECU 16 can be, for example, a processor for the sensor hub or some other processor in the portable computing device 10.

Figure 2:
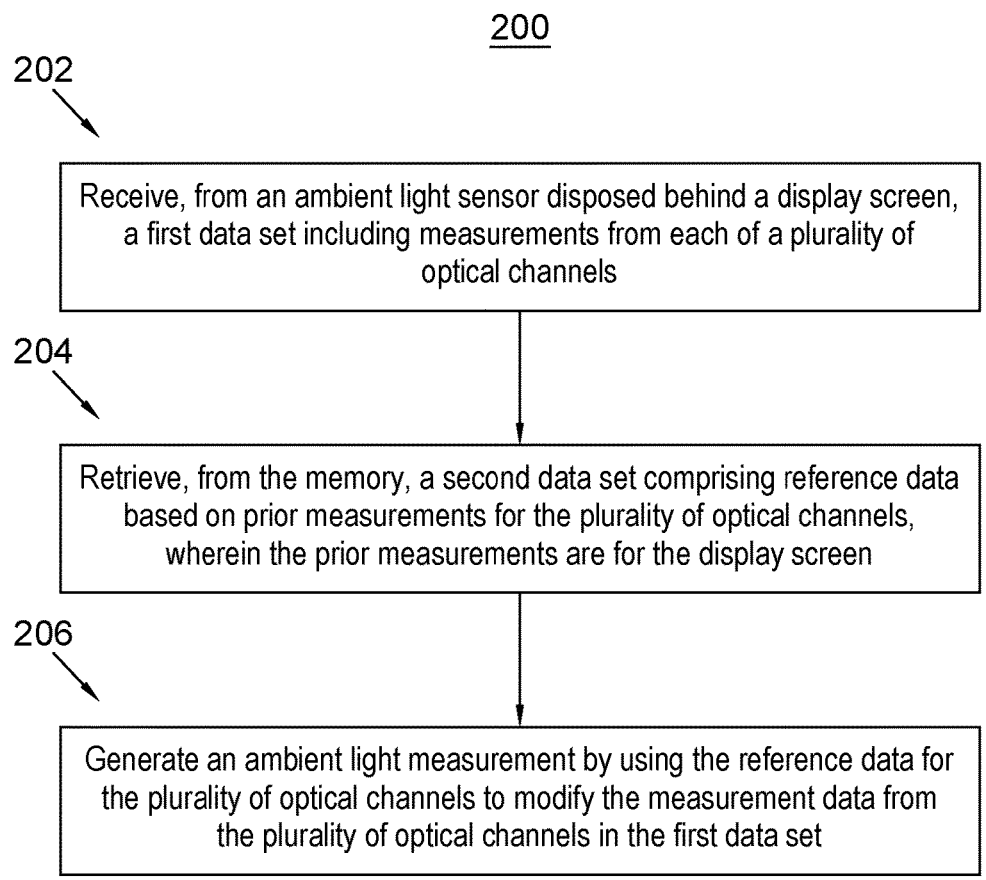
FIG. 2 is a block diagram that illustrates actions for generating an ambient light measurement.

The components described above may be used to generate an ambient light measurement adjusted for light generated by a display behind which an ambient light sensor resides. FIG. 2 is a block diagram that illustrates an example of actions for generating an ambient light measurement. At 202, an electronic control unit receives, from an ambient light sensor disposed behind a display screen, a first data set including measurements from each of a plurality of optical channels. For example, ECU 16 may receive the first data set from ALS 14. The image sensor may include a particular number of optical channels (e.g., eleven channels). Each optical channel may be configured to generate a spectral response to a specific portion of the visible light spectrum, while other portions of the visible light spectrum are filtered out and other optical channels generate a spectral response to those portions. For example, if a host device has eleven optical channels, the visible light spectrum may be divided into eleven ranges. The visible light spectrum has a wavelength of about 380 nanometers to 750 nanometers. So, each optical channel may be configured generate a spectral response to about 34 nanometers of visible light. In some embodiments, optical channels that generate spectral response to infrared light may be used.

Figure 4:
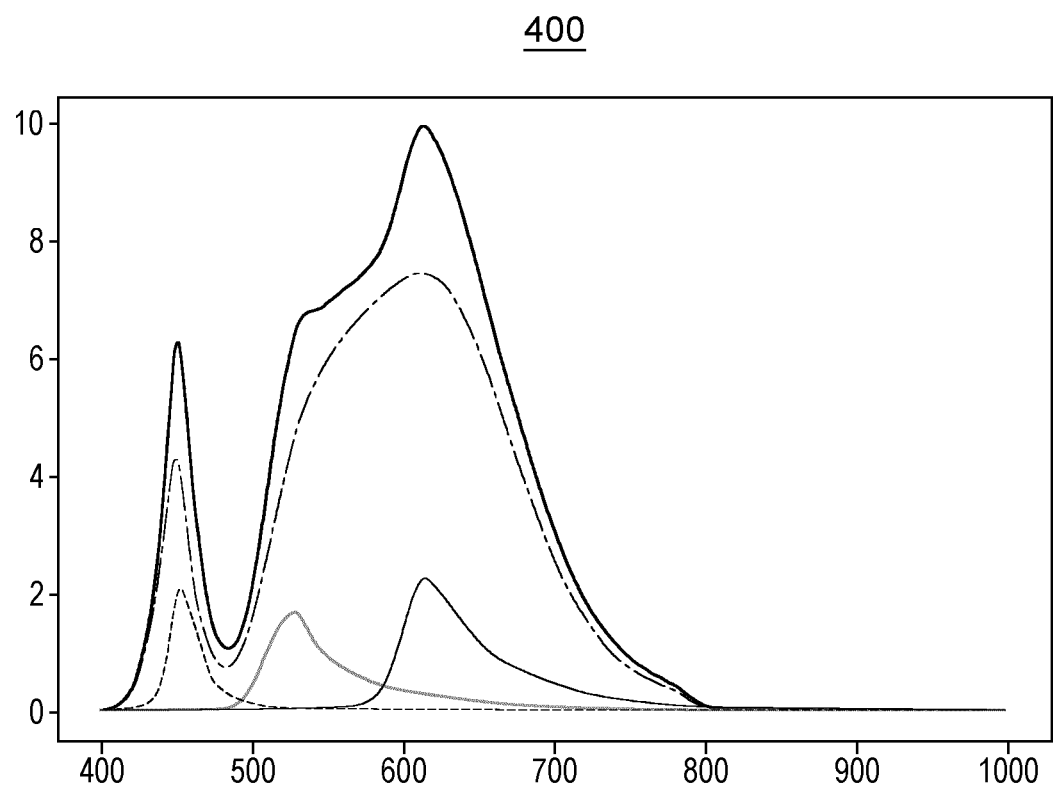
FIG. 4 illustrates a spectral power distribution graph combining the linear components of an LED light source and an OLED display.

As discussed above, spectral decomposition of ambient light measurements into independent sources can be performed in order to generate the ambient light measurement. That decomposition may be used on the received first data set. The principle behind spectral decomposition is illustrated in the following figures. FIG. 3 illustrates a spectral power distribution ("SPD") graph 300 and spectral power distribution graph 320. Curve 302 illustrates a spectral power distribution for a Light Emitting Diode ("LED") light source. The spectral power distribution is shown for different wavelengths. Spectral power distribution graph 320 illustrates spectral power distribution for each of the red, green and blue components of light emitted by an OLED display. Curve 322 illustrates the blue component, curve 324 illustrates the green component, and curve 326 illustrates the red component. Combining the linear components of these two light sources produces a graph as shown in FIG. 4. Thus, SPD graph 400 of FIG. 4 illustrates that the spectrum of both the LED and OLED light sources is a linear sum of contributions from the RGB primaries of the OLED and the LED. Given enough spectral information, the ECU (e.g., ECU 15) can be programmed to make significant inferences about the relative contributions of the OLED and the ambient light.

Figure 5:
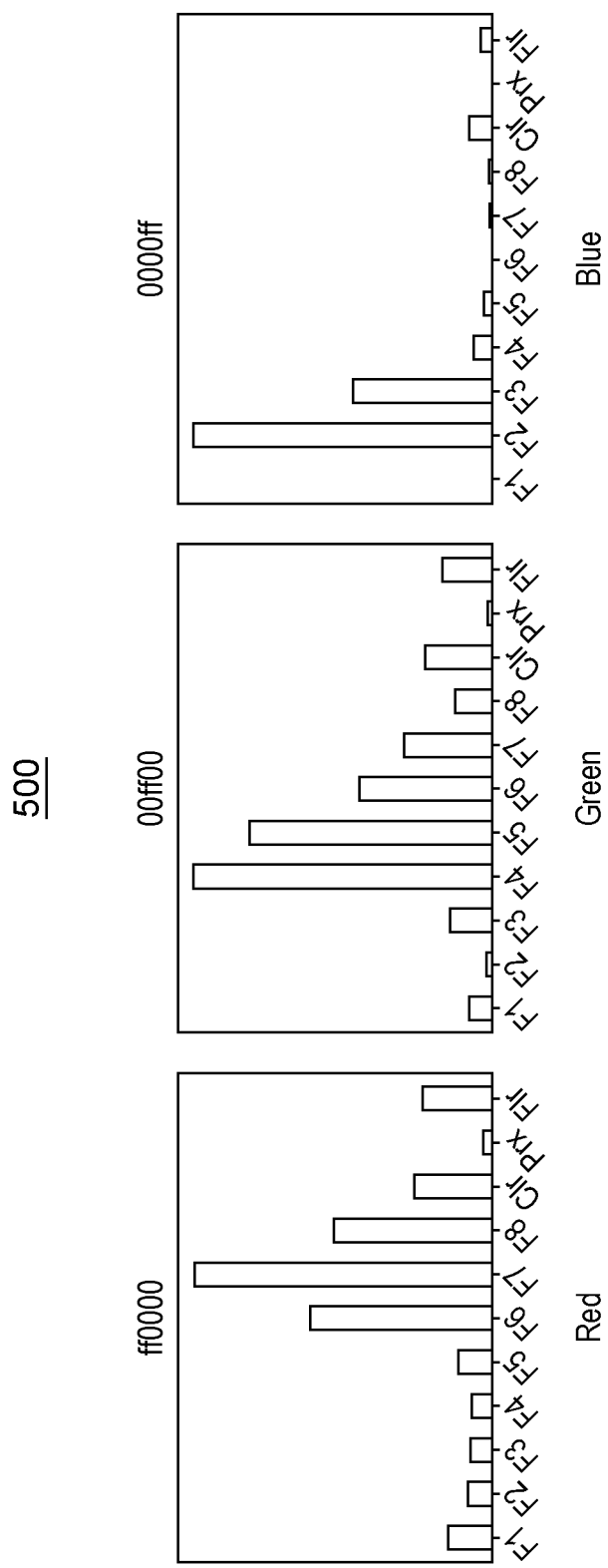
FIG. 5 illustrates spectral power for each optical channel of each of red, green, and blue light components of a display's light output.

As further shown in FIG. 2, at 204 the ECU (e.g., ECU 16) retrieves, from the memory, a second data set that includes reference data based on prior measurements for the plurality of channels, where the prior measurements are for the display screen. For example, graph 500 of FIG. 5 illustrates the spectral power for each optical channel of each of the red, green, and blue components of the display (e.g., OLED display). That data is an example of reference data that can be retrieved by the ECU (e.g., ECU 16).

At 206 of FIG. 2 the ECU (e.g., ECU 16) generates an ambient light measurement by using the reference data for the optical channels to modify the measurement data from the optical channels in the first data set. For example, the ECU may generate a first vector from the first data set, where the first vector has a number of dimensions equal to a number of optical channels, and where each value within the first vector corresponds to a measurement from an optical channel of the optical channels. Vector 610 of FIG. 6 illustrates an example of such a vector.

The ECU (e.g., ECU 16) may retrieve a second vector corresponding to a second data set, where each value within the second vector corresponds to a stored reference light unit measurement for a corresponding optical channel. For example, as illustrated in FIG. 6, the ECU may retrieve vectors 602, 604, and 606 corresponding to RGB values for a display. In some embodiments, the vectors may be unit vectors and may need to be modified by a magnitude to give a true measurement of the display. The unit vectors can be modified, for example, by identifying a magnitude that fits within the vector associated with the first data set.

Therefore, the ECU (e.g., ECU 16) generates the ambient light measurement by subtracting, from the first vector, the second vector that is modified by a magnitude value of light produced by the display screen. This is illustrated by vector 608 of FIG. 6. When the ECU subtracts vectors 602, 604, and 606 from vector 610, vector 608 corresponds to values for an ambient light measurement.

Figure 7:
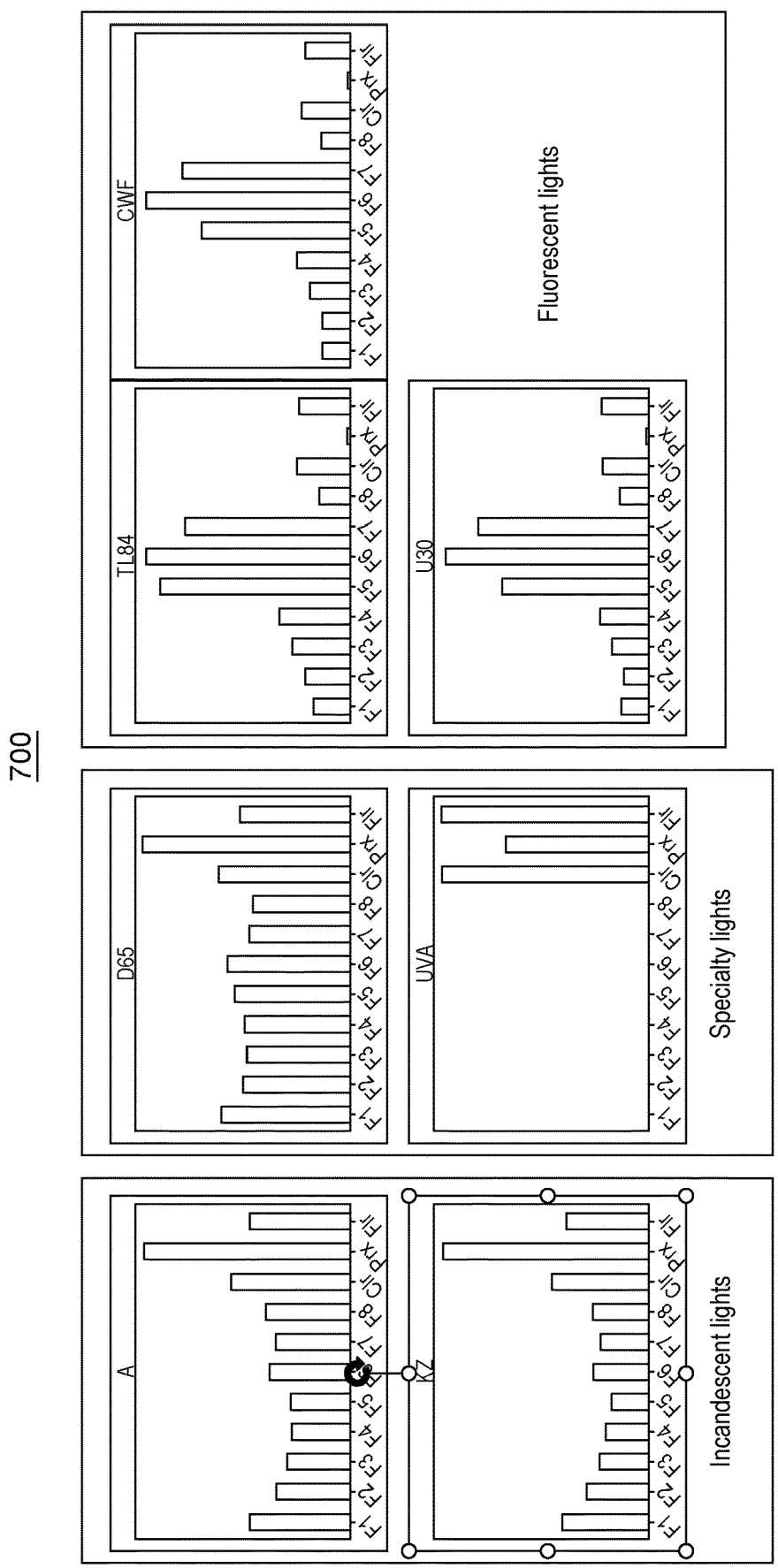
FIG. 7 illustrates different possible vectors for different types of light.

In some embodiments, the ECU (e.g., ECU 16) identifies one or more light sources acting upon the sensor. Specifically, in such instances, the ECU (e.g., ECU 16) retrieves, from the memory, a plurality of unit vectors for a plurality of known ambient light sources, where the unit vectors include one or more of a unit vector for a single light source and a unit vector for light sources of one type. For example, chart 700 of FIG. 7 illustrates different possible vectors for different types of light. This example includes eleven dimension vectors, but vectors of different dimensions are possible. Generally, the number of dimensions equals, but can be less than, a number of optical channels available for measurements.

The ECU (e.g., ECU 16) identifies, using the unit vectors and the ambient light measurement, one or more ambient light sources detected by the ambient light sensor. For example, if the ambient light measurement matches an incandescent light unit vector as shown in FIG. 7 (e.g., by applying a magnitude to the unit vector), the ECU (e.g., ECU 16) determines that light from an incandescent light is being detected by the ALS (e.g., ALS 14).

In some embodiments, the ECU (e.g., ECU 16) may generate linear equations corresponding to the optical channels, where a number of unknowns within the linear equations corresponds to the number of the one or more ambient light sources. FIG. 8 illustrates a number of vectors that include both the vectors for RGB values for the OLED display and vectors for two light sources affecting the ALS (e.g., ALS 14). For example, if the ambient light spectrum is not known (e.g., no single light source matches the characteristics of the ambient light measurement), there may be more than one light source. The ECU (e.g., ECU 16) may transform this data into a linear algebra problem where a number of optical channels equals to number of equations and a number of light types (including the three display LEDs) represents the number of unknowns. If the number of equations is equal to or greater than the number of unknowns, a unique solution can be found. However, if there are more light types than equations (e.g., a total of nine different light types) the ECU (e.g., ECU 16) does not necessarily need nine optical channels for a unique solution. This is because an assumption can be made such that only one or two ambient light types will have non-zero scalars (e.g., probably halogen, incandescent and fluorescent lights are not affecting the ALS at the same time). Also, the scalars must be greater than zero (light cannot be negative), and red, green, and blue detected components (e.g., $r_s$, $g_s$, and $b_s$ illustrated in FIG. 6) can only be so large. As illustrated in FIG. 6, $r_s$ $g_s$, and $b_s$ each multiply a vector corresponding to scalar values for each optical channel for the red, green, and blue component of the display screen, respectively. The necessary number of optical channels may also depend on the spectral sensitivity of each optical channel. There may not be a need to differentiate two light sources as long as they have similar spectrums in the visible light region. This is especially important, if determining lux is a priority. As used herein, the term lux refers to a unit of illuminance that is equal to one lumen per square meter.

In some embodiments, the ECU may use prior stored knowledge about the display content to improve our approximation. The vector equation 900 of FIG. 9 can be expressed as Ax=y, which has the following Bayesian least squares solution: $((X^TX+\Lambda)^{-1}(\Lambda\mu+X^Ty)$, where $\mu$ is a prior estimate of x (e.g. based on frame buffer knowledge or 60 Hz display measurement) and Λ is valued depending on how much the prior estimate can be relied upon (see effect when Λ is very small or very large and Λ are the mean vector and covariance matrix of a Gaussian conjugate prior). Alternatively, prior estimates may be used to restrict the acceptable values of rs, gs, and bs in a constrained least squares solution.

In some embodiments, different functions may be performed in response to the type of ambient light(s) detected. Specifically, the electronic control unit may modify an output of the display screen based on one or more of a type and a magnitude of the one or more ambient light sources. For example, if there is only a small amount of ambient light being detected, the electronic control unit may instruct the device (e.g., a smartphone) to adjust the brightness of the screen display. In some embodiments, the electronic control unit modifies a setting of a camera based on one or more of a type and a magnitude of the one or more ambient light sources. For example, the electronic control unit may modify a setting of a flash of a camera based on the type of light to get to a proper light temperature in a picture.

It is also possible to make these modifications based on the ambient light measurement itself, instead of the types of light sources. Specifically, in some instances, the electronic control unit modifies an output of the display screen based on the ambient light measurement. In some embodiments, the electronic control unit modifies a setting of the camera based on the ambient light measurement. For example, the host device (e.g., a smartphone) may include a database of different ambient light measurements and corresponding display screen modifications. The electronic control unit, may compare the ambient light measurement detected with different ambient light measurements in the database to determine which function to execute. Those functions may be camera modification options, display screen modification options, and/or other suitable options.

There are various methods of obtaining the reference data for both the display light emissions and for identifying the ambient light source or sources. A list of measured light sources and also explored PCA-like techniques may be used. This technique generates basis vectors that provide a good description of real-world light sources. For example, the SPD of almost all typical white LEDs can be almost fully described using just two components. Many formulations of the model rely on "training" the algorithm with certain known light sources.

OLED displays use only three unique LED colors; thus, the light emitted by an OLED display can be described in a three-dimensional space (e.g. RGB). With n photodiodes of unique spectral response, light can be described in n-dimensional space. By definition, each n-dimensional space can be represented by n orthogonal vectors which can be referred to as basis vectors.

OLED display light can be described with three vectors which are orthogonal to n−3 of the basis vectors. The n−3 basis vectors which are not influenced by display light and can be used to predict ambient lux. In this n−3 dimensional space, the ECU may calculate lux by taking the dot product between our n−3 dimensional measurement and the n−3 dimensional description of the light source and then scaling by an empirically derived gain factor.

In one example, six unique photodiode channels (i.e., C, R, G, B, W, F) can be used. The red, green, and blue photodiodes in an OLED display excite these six photodiodes in a unique way:
red: [0.4098, 0.3737, 0.0602, 0.0289, 0.3707, 1.9146]
green: [0.4631, 0.1105, 0.2890, 0.1036, 0.1956, 0.8549]
blue: [0.1334, 0.0101, 0.0272, 0.1059, 0.0592, 0.1298]

Using an additional (random) three vectors, an entire 6-dimensional space can be described with the following matrix. This data can be stored in memory for later processing
[[0.4098, 0.3737, 0.0602, 0.0289, 0.3707, 1.9146],
[0.4631, 0.1105, 0.2890, 0.1036, 0.1956, 0.8549],
[0.1334, 0.0101, 0.0272, 0.1059, 0.0592, 0.1298],
[1, 0, 0, 0, 0, 0],
[0, 1, 0, 0, 0, 0],
[0, 0, 1, 0, 0, 0]]

Using a technique such as Gram-Schmidt or PCA, the ECU may find a linear transformation which takes a matrix from the previous step and transforms it into a set of orthogonal vectors. In the transformed matrix, the first three row vectors describe OLED display light while the last three row vectors are orthogonal to display light:
[[5.95170206e-01, 4.52875687e-02, 1.21470132e-01, 4.72515778e-01, 2.64526569e-01, 5.79414362e-01],
[−1.56372394e-01, 1.36093881e-01, 3.50563304e-01, −6.43355981e-01, −8.95402375e-02, 6.42033588e-01],
[−4.14934068e-01, 2.06626662e-01, −7.64134348e-01, 1.25150019e-01, 1.18155348e-01, 4.14259129e-01],
[6.70186406e-01, 1.19465204e-01, −4.99178066e-01, −4.92253227e-01, −1.82655562e-01, −1.08273773e-01],
[−1.44492811e-17, 9.60448322e-01, 1.71080868e-01, 1.03186732e-01, −2.48524360e-03, −1.93950199e-01],
[1.91309557e-15, 0.00000000e+00, 1.29214431e-03, 3.06917991e-01, −9.35242387e-01, 1.76412455e-01]]

Figure 10:
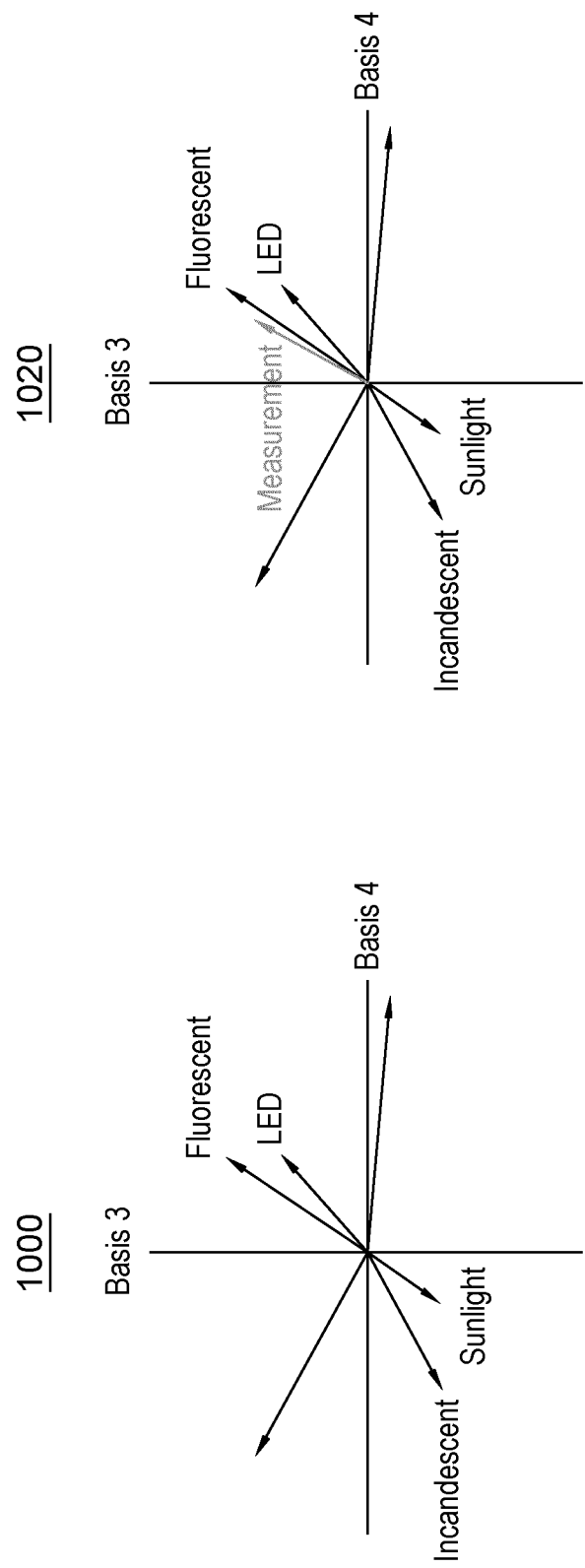
FIG. 10 illustrates a graph of transformed measurements.

The transformed measurements are illustrated in graph 1000 of FIG. 10. After taking a raw measurement and projecting it onto a derived basis vectors, the data may be analyzed for ambient light. Basis vectors 0, 1 and 2 initially are discarded because they are polluted by display light. Basis vectors 3, 4 and 5 can be used to predict the light type and approximate ambient lux. FIG. 10 illustrates an example (not necessarily representative of real data) of how the magnitude of measurement along the 3rd and 4th basis vectors can be used to determine light type and lux. For example, $\tan^{-1}(x/y)$ gives an indication of light type while $(x^2+y^2)^{(1/2)}$ is proportional to lux.

One approach to predicting light type is comparing a measurement vector with all known ambient light source vectors (or a subset of such ambient light source vectors). The smaller the angle between a measurement vector and a light type vector, the more likely that the measurement came from that light type. As illustrated by chart 1020 of FIG. 10 the measurement probably came from a fluorescent light. To predict the lux of our measurement, the measurement vector can be projected onto the nearest ambient light vector. This technique can be applied in a 2-dimensional space as is shown in FIG. 10 or in more than two dimensions.

Figure 11:
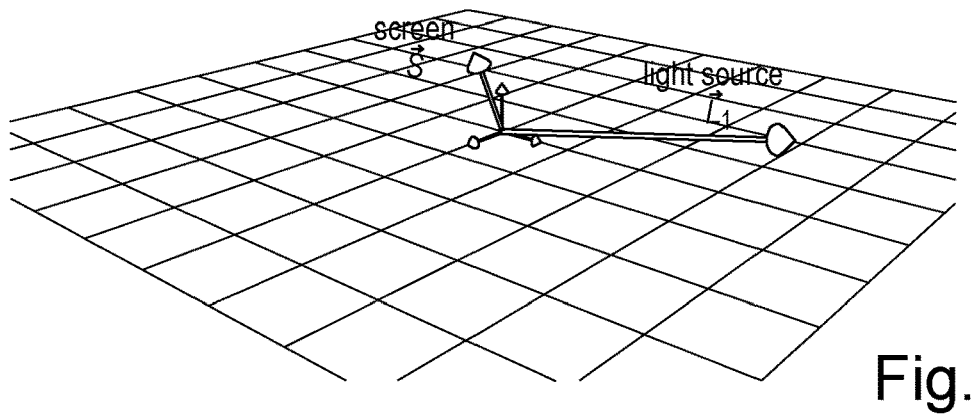
FIG. 11 illustrates theoretical spectral vectors for the screen and ambient light source.
Figure 12:
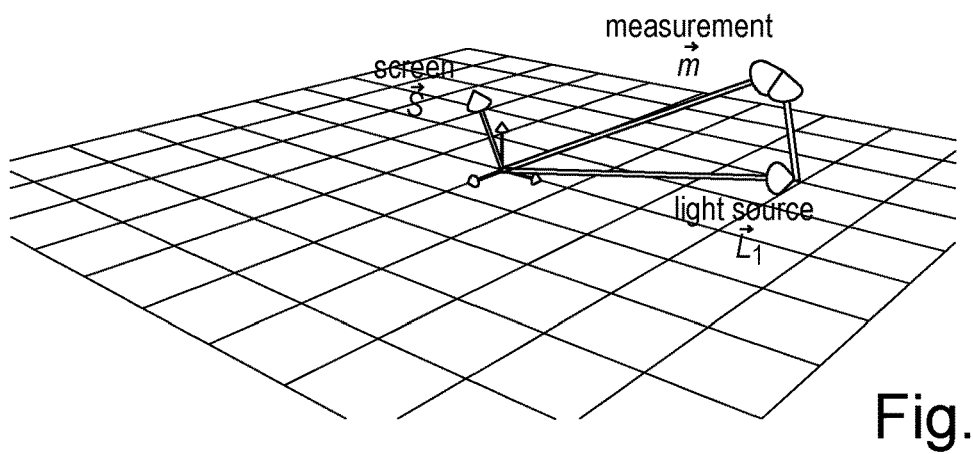
FIG. 12 illustrates a measurement with the display on while the sensor is under the light source.
Figure 13:
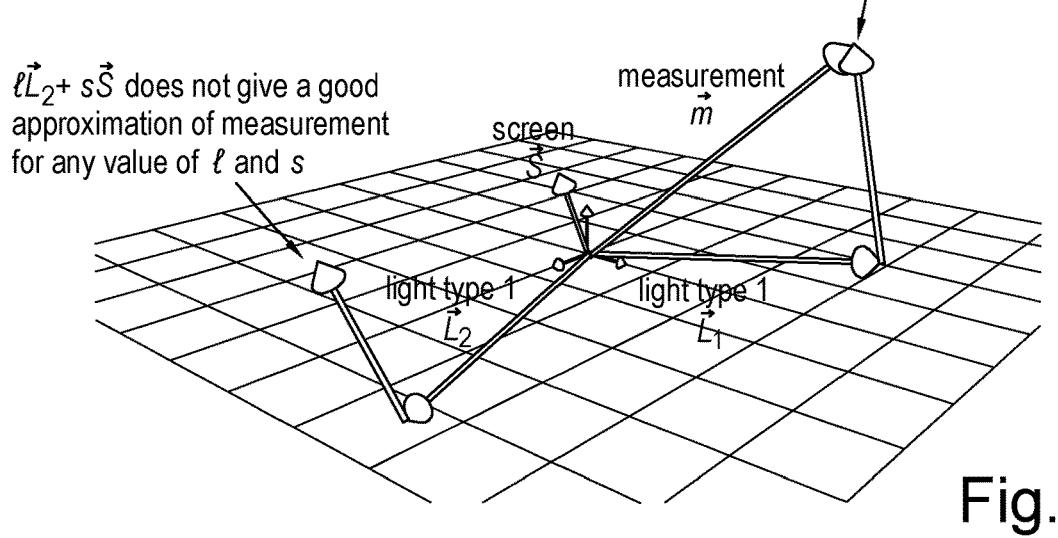
FIG. 13 illustrates vectors for two light sources in addition to the screen and how a measurement can be matched to a light source.

Another example of the claimed technique is illustrated by FIGS. 11-13. Instead of having eleven dimension vectors as with a prior example, three dimensional vectors can be used and illustrated within three dimensional space. Instead of considering about 3-4 different light types, only two possible light types are considered for this example. FIG. 11 illustrates a theoretical spectral vectors for the screen and ambient light source. As illustrated by FIG. 11, the x axis, y axis and z axis each represent the output of a hypothetical 3-channel part. If a measurement was taken using the ALS with the display screen on while the phone is in the dark, the result would be three numbers that can be represented as components of vector $\vec{s}$. If the brightness of the display screen is changed, the resulting vector would point in the same direction as $\vec{s}$, but with a different magnitude. Similarly, a measurement of a particular ambient light type (e.g. incandescent) is taken while the screen is off would result in three numbers that can be represented as the components of vector $\vec{L}\_1$ (e.g., as illustrated in FIG. 11). If the light source is moved to a different location, a vector in the same direction as $\vec{L}\_1$, but with a different magnitude would be detected.

FIG. 12 illustrates a measurement with the display on while the sensor is under the light source. It can be represented as a sum $\vec{m} = l\vec{L}\_1 + s\vec{S}$ where l and s are scalars and $\vec{L}\_1$ and $\vec{S}$ now represent unit vectors pointing in the direction of the light source and screen measurements. The sum can be visualized (as illustrated in FIG. 12) by putting the vectors head-to-tail. If a measurement was taken with the screen on while under the light source, the measurement is a vector. It can be represented as a sum $\vec{m} = l\vec{L} + s\vec{S}$ where l and s are scalars and $\vec{L}\_1$ and $\vec{S}$ now represent unit vectors pointing in the direction of the light source and screen measurements. Again, the sum can be visualized by putting the vectors head-to-tail.

FIG. 13 illustrates vectors for two light sources in addition to the display screen and how a measurement can be matched to a light source. The type of light can be determined by assuming that the host device is only in the presence of one light source. Specifically, $l\vec{L}\_2 + s\vec{S}$ does not give a good approximation of measurement for any value of € and s. However, $l\vec{L}\_1 + s\vec{S}$ gives a good approximation of measurement vector for appropriate values of l and s. Therefore, the device is likely under Light type 1. Using € and our information about light type 1, the ECU (e.g., ECU 16) can estimate the lux excluding the contribution from the display.

The design of smartphones and other host computing devices referenced in this disclosure can include one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

Various aspects of the subject matter and the functional operations described in this disclosure can be implemented in digital electronic circuitry, or in software, firmware, or hardware, including the structures disclosed in this specification and their structural equivalents, or in combinations of one or more of them. The electronic control unit incorporates digital control circuitry that is configured to perform the actions required to generate an ambient light measurement. In some embodiments, the electronic control unit may incorporate one or more of software, firmware, or other hardware to facilitate the actions of this disclosure. In addition, aspects of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

The invention claimed is:

1. An apparatus comprising:
a display screen;
a memory;
an ambient light sensor disposed behind the display screen; and
an electronic control unit configured to:
receive, from the ambient light sensor, a first data set comprising measurement data from each of a plurality of optical channels;
retrieve, from the memory, a second data set comprising reference data based on prior measurements for the plurality of optical channels, wherein the prior measurements are for the display screen;
generate an ambient light measurement by using the reference data for the plurality of optical channels to modify the measurement data from the plurality of optical channels in the first data set; and
generate a first vector from the first data set, wherein the first vector has a number of dimensions corresponding to a number of optical channels in the plurality of optical channels, and wherein each value within the first vector corresponds to a measurement from an optical channel of the plurality of optical channels,
wherein the electronic control unit is operable to:
retrieve the second data set retrieving a second vector, and wherein each value within the second vector corresponds to a stored reference light unit measurement, and
generate the ambient light measurement by performing actions including subtracting, from the first vector, the second vector that is modified by a magnitude value of light produced by the display screen.

2. The apparatus of claim 1, wherein the electronic control unit is further configured to:
retrieve, from the memory, a plurality of unit vectors for a plurality of known ambient light sources, wherein the plurality of unit vectors comprises one or more of a unit vector for a single light source and a unit vector for a plurality of light sources of one type; and
identify, using the plurality of the unit vectors and the ambient light measurement, one or more ambient light sources detected by the ambient light sensor.

3. The apparatus of claim 2, wherein the electronic control unit is operable to identify the one or more ambient light sources by performing actions including generating a plurality of linear equations corresponding the plurality of optical channels, wherein a number of unknowns within the plurality of linear equations corresponds to the number of the one or more ambient light sources.

4. The apparatus of claim 3, wherein the electronic control unit is further configured to modify an output of the display screen based on one or more of a type of the one or more ambient light sources and a of a detected signal from the one or more light sources.

5. The apparatus of claim 3, wherein the apparatus further comprises a camera, and wherein the electronic control unit is further configured to modify a setting of the camera based on one or more of a type of the one or more ambient light sources and a magnitude of a detected signal from the one or more light sources.

6. The apparatus of claim 1, wherein the electronic control unit is further configured to modify an output of the display screen based on the ambient light measurement.

7. The apparatus of claim 1, wherein the apparatus further comprises a camera, and wherein the electronic control unit is further configured to modify a setting of the camera based on the ambient light measurement.

8. A method comprising:
receiving, from an ambient light sensor disposed behind a display screen, a first data set comprising measurements from each of a plurality of optical channels;
generating a first vector from the first data set, wherein the first vector has a number of dimensions corresponding to a number of optical channels in the plurality of optical channels, and wherein each value within the first vector corresponds to a measurement from an optical channel of the plurality of optical channels;
retrieving, from a memory, a second data set comprising reference data based on prior measurements for the plurality of optical channels, wherein the prior measurements are for the display screen, wherein retrieving the second data set comprises retrieving a second vector, and wherein each value within the second vector corresponds to a stored reference light unit measurement for a corresponding optical channel; and
generating an ambient light measurement by using the reference data for the plurality of optical channels to modify the measurement data from the plurality of optical channels in the first data set; wherein generating the ambient light measurement comprises subtracting, from the first vector, the second vector that is modified by a magnitude value of light produced by the display screen.

9. The method of claim 8, further comprising:
retrieving, from the memory, a plurality of unit vectors for a plurality of known ambient light sources, wherein the plurality of unit vectors comprises one or more of a unit vector for a single light source and a unit vector for a plurality of light sources of one type; and
identifying, using the plurality of the unit vectors and the ambient light measurement, one or more ambient light sources detected by the ambient light sensor.

10. The method of claim 9, wherein identifying the one or more ambient light sources comprises generating a plurality of linear equations corresponding the plurality of optical channels, wherein a number of unknowns within the plurality of linear equations corresponds to the number of the one or more ambient light sources.

11. The method of claim 10, further comprising modifying an output of the display screen based on one or more of a type of the one or more ambient light sources and a magnitude of a detected signal from the one or more light sources.

12. The method of claim 10, further comprising modifying a setting of a camera based on one or more of a type of the one or more ambient light sources and a magnitude of a detected signal from the one or more light sources.

13. The method of claim 8, further comprising modifying an output of the display screen based on the ambient light measurement.

14. The method of claim 8, further comprising modifying a setting of the camera based on the ambient light measurement.

15. An apparatus comprising:
a display screen;
a memory;
an ambient light sensor disposed behind the display screen; and
an electronic control unit configured to:
receive, from the ambient light sensor, a first data set comprising measurement data from each of a plurality of optical channels;
retrieve, from the memory, a second data set comprising reference data based on prior measurements for the plurality of optical channels, wherein the prior measurements are for the display screen;
generate an ambient light measurement by using the reference data for the plurality of optical channels to modify the measurement data from the plurality of optical channels in the first data set;
retrieve, from the memory, a plurality of unit vectors for a plurality of known ambient light sources, wherein the plurality of unit vectors comprises one or more of a unit vector for a single light source and a unit vector for a plurality of light sources of one type; and
identify, using the plurality of the unit vectors and the ambient light measurement, one or more ambient light sources detected by the ambient light sensor,
wherein the electronic control unit is operable to identify the one or more ambient light sources by performing actions including generating a plurality of linear equations corresponding the plurality of optical channels, wherein a number of unknowns within the plurality of linear equations corresponds to the number of the one or more ambient light sources.

16. The apparatus of claim 15, wherein the electronic control unit is further configured to modify an output of the display screen based on one or more of a type of the one or more ambient light sources and a of a detected signal from the one or more light sources.

17. The apparatus of claim 15, wherein the apparatus further comprises a camera, and wherein the electronic control unit is further configured to modify a setting of the camera based on one or more of a type of the one or more ambient light sources and a magnitude of a detected signal from the one or more light sources.

18. A method comprising:
receiving, from an ambient light sensor disposed behind a display screen, a first data set comprising measurements from each of a plurality of optical channels;
retrieving, from a memory, a second data set comprising reference data based on prior measurements for the plurality of optical channels, wherein the prior measurements are for the display screen;
retrieving, from the memory, a plurality of unit vectors for a plurality of known ambient light sources, wherein the plurality of unit vectors comprises one or more of a unit vector for a single light source and a unit vector for a plurality of light sources of one type;
generating an ambient light measurement by using the reference data for the plurality of optical channels to modify the measurement data from the plurality of optical channels in the first data set; and
identifying, using the plurality of the unit vectors and the ambient light measurement, one or more ambient light sources detected by the ambient light sensor, wherein the identifying the one or more ambient light sources comprises generating a plurality of linear equations corresponding the plurality of optical channels, wherein a number of unknowns within the plurality of linear equations corresponds to the number of the one or more ambient light sources.

19. The method of claim 18, further comprising modifying an output of the display screen based on one or more of a type of the one or more ambient light sources and a magnitude of a detected signal from the one or more light sources.

20. The method of claim 18, further comprising modifying a setting of a camera based on one or more of a type of the one or more ambient light sources and a magnitude of a detected signal from the one or more light sources.

* * * * *